US010828840B2

(12) United States Patent
Hooberman et al.

(10) Patent No.: US 10,828,840 B2
(45) Date of Patent: Nov. 10, 2020

(54) ELECTROMAGNETIC INDUCTION WELDING OF FLUID DISTRIBUTION SYSTEMS

(71) Applicant: HULIOT A.C.S. LTD, Upper Galilee (IL)

(72) Inventors: Gideon Hooberman, Kiryat Tivon (IL); Paul Steiner, Upper Galilee (IL); Ilan Yogev, Upper Galilee (IL)

(73) Assignee: HULIOT A.C.S. LTD, Upper Galilee (IL)

( * ) Notice: Subject to any disclaimer, the term of this patent is extended or adjusted under 35 U.S.C. 154(b) by 327 days.

(21) Appl. No.: 15/123,968

(22) PCT Filed: Mar. 3, 2015

(86) PCT No.: PCT/IL2015/050225
§ 371 (c)(1),
(2) Date: Sep. 6, 2016

(87) PCT Pub. No.: WO2015/132783
PCT Pub. Date: Sep. 11, 2015

(65) Prior Publication Data
US 2017/0015050 A1 Jan. 19, 2017

(30) Foreign Application Priority Data

Mar. 4, 2014 (IL) .......................................... 231306

(51) Int. Cl.
*B29C 65/14* (2006.01)
*F16L 47/02* (2006.01)
(Continued)

(52) U.S. Cl.
CPC .......... *B29C 65/148* (2013.01); *B29C 65/368* (2013.01); *B29C 65/3656* (2013.01);
(Continued)

(58) Field of Classification Search
CPC . B29C 66/8221; B29C 66/861; B29C 66/522; B29C 66/8614; B29C 66/83241;
(Continued)

(56) References Cited

U.S. PATENT DOCUMENTS 1,316,190 A * 9/1919 Sackerman ............. F16L 53/38
138/33
3,428,769 A * 2/1969 Ciszewski et al. .... B23K 1/002
219/611
(Continued)

FOREIGN PATENT DOCUMENTS

CN 102159867 A 8/2011
DE 29706501 U1 10/1997
(Continued)

OTHER PUBLICATIONS

International Search Report dated Nov. 27, 2012, for International Application No. PCT/IL2012/000150.
(Continued)

*Primary Examiner* — Christopher T Schatz
*Assistant Examiner* — Cynthia L Schaller
(74) *Attorney, Agent, or Firm* — Novick, Kim & Lee, PLLC; Harold L. Novick

(57) ABSTRACT

Installation fittings for use with induction weldable pipe connectors for assembling multi-layer pipe fluid distribution systems. Induction welding pipe connectors including a major central pipe connector section and a minor lateral pipe connector section pair having reduced thickness relative to the major central pipe connector section. Induction welding pipe connectors with integral solder flow barrier for assembling fluid distribution systems. Electromagnetic induction coil reverse action pliers for use with induction weldable pipe connectors for assembling fluid distribution systems.

5 Claims, 15 Drawing Sheets

(51) Int. Cl.
*F16L 9/147* (2006.01)
*B29C 65/00* (2006.01)
*B29C 65/36* (2006.01)
*B29C 65/78* (2006.01)
*B29K 705/02* (2006.01)
*B29K 101/12* (2006.01)
*B29L 23/00* (2006.01)

(52) U.S. Cl.
CPC ...... *B29C 65/3668* (2013.01); *B29C 65/7817* (2013.01); *B29C 66/1222* (2013.01); *B29C 66/1224* (2013.01); *B29C 66/1226* (2013.01); *B29C 66/12441* (2013.01); *B29C 66/3242* (2013.01); *B29C 66/3472* (2013.01); *B29C 66/522* (2013.01); *B29C 66/5221* (2013.01); *B29C 66/52241* (2013.01); *B29C 66/52291* (2013.01); *B29C 66/52292* (2013.01); *B29C 66/52296* (2013.01); *B29C 66/52298* (2013.01); *B29C 66/63* (2013.01); *B29C 66/636* (2013.01); *B29C 66/72321* (2013.01); *B29C 66/7392* (2013.01); *B29C 66/7394* (2013.01); *B29C 66/73921* (2013.01); *B29C 66/81262* (2013.01); *B29C 66/81423* (2013.01); *B29C 66/8221* (2013.01); *B29C 66/83241* (2013.01); *B29C 66/861* (2013.01); *B29C 66/8614* (2013.01); *B29C 66/972* (2013.01); *F16L 9/147* (2013.01); *F16L 47/02* (2013.01); *B29C 66/12469* (2013.01); *B29C 66/71* (2013.01); *B29C 66/73116* (2013.01); *B29C 66/8748* (2013.01); *B29C 66/9672* (2013.01); *B29C 66/9674* (2013.01); *B29K 2101/12* (2013.01); *B29K 2705/02* (2013.01); *B29K 2995/0008* (2013.01); *B29L 2023/22* (2013.01); *F16L 2201/10* (2013.01)

(58) Field of Classification Search
CPC .............. B29C 65/148; B29C 66/7394; B29C 66/7392; B29C 66/52296; B29C 65/3668; B29C 66/52298; B29C 66/81262; B29C 66/52291; B29C 65/7817; B29C 65/3656; B29C 66/972; B29C 66/81423; B29C 66/73921; B29C 66/72321; B29C 66/636; B29C 66/52292; B29C 66/52241; B29C 66/5221; B29C 66/3472; B29C 66/3242; B29C 66/12441; B29C 66/1226; B29C 66/1224; B29C 66/1222; B29C 65/368; B29C 66/8748; B29C 66/9672; B29C 66/73116; B29C 66/12469; B29K 2101/12; B29K 2995/0008; B29K 2705/02; B29L 2023/22; F16L 2201/10
See application file for complete search history.

(56) References Cited

U.S. PATENT DOCUMENTS

| | | | |
|---|---|---|---|
| 4,634,844 A | 1/1987 | Lodder et al. | |
| 5,125,690 A | 6/1992 | Taylor et al. | |
| 5,462,314 A | 10/1995 | Goto et al. | |
| 5,466,916 A | 11/1995 | Iguchi et al. | |
| 5,526,561 A | 6/1996 | McGaffigan | |
| 6,293,311 B1 | 9/2001 | Bushi et al. | |
| 6,509,555 B1 | 1/2003 | Riess et al. | |
| 6,639,197 B2 | 10/2003 | Riess et al. | |
| 6,639,198 B2 | 10/2003 | Riess et al. | |
| 6,710,314 B2 | 3/2004 | Reiss et al. | |
| 6,849,837 B2 | 2/2005 | Riess et al. | |
| 6,875,966 B1 | 4/2005 | Barber et al. | |
| 7,025,245 B2 * | 4/2006 | Gust | B23K 13/01 228/102 |
| 7,141,768 B2 | 11/2006 | Malofsky et al. | |
| 7,220,948 B2 | 5/2007 | Holzer et al. | |
| 7,344,161 B2 | 3/2008 | Howard et al. | |
| 7,399,949 B2 | 7/2008 | Barber et al. | |
| 7,491,916 B1 | 2/2009 | Barber et al. | |
| 8,327,900 B2 | 12/2012 | Stauffer et al. | |
| 8,424,924 B2 | 4/2013 | LaMarca et al. | |
| 2002/0011305 A1 | 1/2002 | Malofsky et al. | |
| 2003/0102671 A1 | 6/2003 | Fritze | |
| 2004/0091694 A1 | 5/2004 | Holzer et al. | |
| 2008/0029507 A1 | 2/2008 | Barber et al. | |
| 2010/0084097 A1 | 4/2010 | Stauffer et al. | |

FOREIGN PATENT DOCUMENTS

| | | |
|---|---|---|
| EP | 0294008 A2 | 12/1988 |
| EP | 0333379 A2 | 9/1989 |
| EP | 0645234 A1 | 3/1995 |
| EP | 2172328 A1 | 4/2010 |
| GB | 2314597 A | 1/1998 |
| GB | 2384535 B | 6/2005 |
| JP | H05-118486 A | 5/1993 |
| JP | 05-340496 A | 12/1993 |
| JP | 06-74386 A | 3/1994 |
| JP | 06-174170 A | 6/1994 |
| JP | 6-278211 A | 10/1994 |
| JP | 6-278212 A | 10/1994 |
| JP | 6-281079 A | 10/1994 |
| JP | 7-269774 A | 10/1995 |
| JP | 9-170692 A | 6/1997 |
| JP | 10-278117 A | 10/1998 |
| JP | 2001-208274 A | 8/2001 |
| JP | 2008-111459 A | 5/2008 |
| WO | 91/09247 A1 | 9/1991 |
| WO | 2010/033163 A2 | 3/2010 |
| WO | WO-2012-137197 A2 * | 10/2012 |
| WO | 2015132783 A2 | 9/2015 |
| WO | 2018/167779 A1 | 9/2018 |

OTHER PUBLICATIONS

SIPO Office Action dated Dec. 24, 2014, for counterpart Chinese Application No. 201280016984.1.
WO 2015/132783 A3, International Search Report for PCT/IL2015/050225, dated Aug. 27, 2015.

* cited by examiner

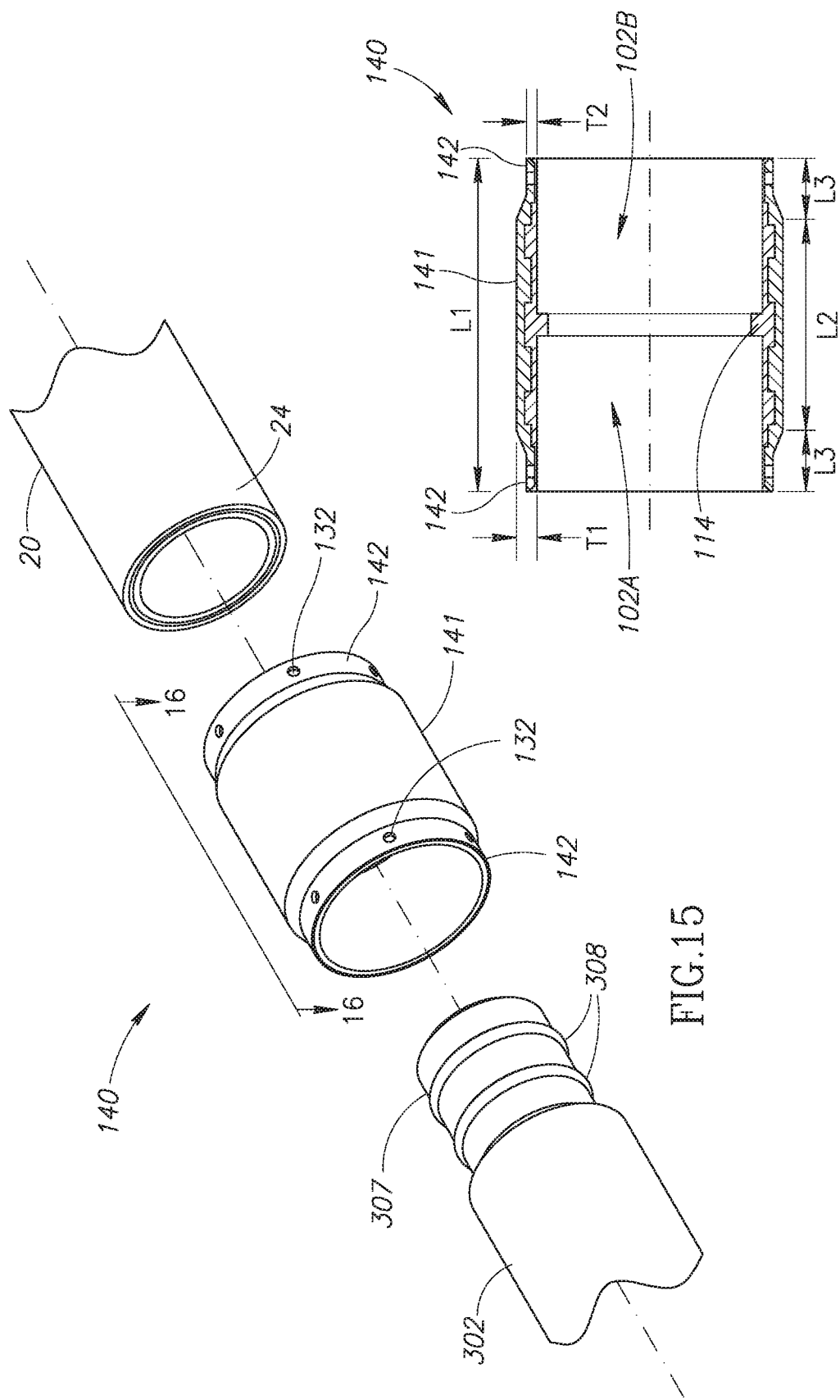

ELECTROMAGNETIC INDUCTION WELDING OF FLUID DISTRIBUTION SYSTEMS

FIELD OF THE INVENTION

The invention relates to electromagnetic induction welding of fluid distribution systems for the transport of fluids in residential, commercial and industrial plumbing systems.

BACKGROUND OF THE INVENTION

Commonly owned WIPO International Publication No. WO 2012/137197 entitled Electromagnetic Induction Welding of Plastic Pipe Distribution Systems discloses induction weldable pipe connectors and electromagnetic induction coil assemblies for use in clamping the induction weldable pipe connector on plastic pipes. The plastic pipes can be made from thermoplastics including inter alia PVC, PP, PP-R, HDPE and the like, and thermosetting plastics including inter alia PEX, and the like. The plastic pipes can have can be fabricated from a single plastic material throughout or alternatively have a multi-layer composition.

The induction weldable pipe connectors each have at least one induction weldable pipe socket. Each induction weldable pipe socket includes a solid metal susceptor sleeve enveloping an internal thermoplastic solder lining. The induction weldable pipe connectors can be implemented in a wide range of pipe fittings including inter alia couplers, elbow fittings, T fittings, Y fittings, X fittings, and the like. The induction weldable pipe connectors can be designed for end-to-end electromagnetic induction welding of two different diameter plastic pipes. The induction weldable pipe connectors can include a connector end with an external or internal screw thread.

Induction welding of an induction weldable pipe connector and a thermoplastic pipe can transfer inadvertently excessive heat energy to a pipe end thereby introducing an undesirable measure of uncertainty in an induction welding operation. Such inadvertent excessive heat energy can be due to a wide range of factors including inter alia tolerances of a thermoplastic pipe and an induction weldable pipe connector, the surface contact between a pipe end and an induction weldable pipe socket, the duration of an induction welding operation, and the like. Such inadvertent excessive heat energy can lead to undesirable internal plastic deformations of a pipe end which may be undetectable to construction personnel assembling a fluid distribution system. Such internal plastic deformations can cause disruptions in fluid flow through a fluid distribution system at an induction weldable pipe connector.

There is a need for controlling induction welding operations to ensure uniformly welded sealed joints to a high degree of certainty.

The European market employs fluid distribution systems made of multi-layer pipes including an aluminum core layer sandwiched between one or more plastic layers including inter alia PEX, and the like. The aluminum core layers afford inherent mechanical rigidity compared to a thermoplastic pipe and prevent diffusion of oxygen or other gases diffusing into a fluid flow. Fluid distribution systems assembled from multi-layer pipes employ inter alia "press fit" fitting systems. The "press fit" fitting systems include "press fit" installation fittings having two or more "press fit" pipe sockets for sealing and securing a pipe end. The "press fit" installation fittings are typically made from metallic or plastic materials. The "press fit" pipe sockets include an annular abutment element mounted on a tubular pipe tang with two or more O-rings for forced sliding insertion into a pipe end. The "press fit" sockets include an elongated sleeve intended to be pressed onto a pipe end in a pressing operation for securing purposes. "Press fit" installation fittings are available in a wide range including inter alia couplers, elbow fittings, T fittings, Y fittings, X fittings, and the like.

"Press fit" installation fittings are relatively expensive and construction personnel require a considerable range of "press fit" installation fittings to complete a multi-layer pipe fluid distribution system. Moreover, pipe tangs necessarily have a smaller internal diameter than the internal diameter of a multi-layer pipe into which they are inserted thereby affecting fluid flow through a "press fit" installation fitting.

There is a need for alternative approaches for assembling multi-layer pipe fluid distribution systems.

SUMMARY OF THE INVENTION

One aspect of the present invention is directed toward installation fittings for use with WO 2012/137197 induction weldable pipe connectors for assembling multi-layer pipe fluid distribution systems. The installation fittings of the present invention are similar to the aforesaid "press fit" installation fittings insofar as they include one or more tubular pipe tangs with at least two O rings for forced sliding insertion into a multi-layer pipe for sealingly engaging an internal plastic layer for protecting its annular aluminium core end surface. The installation fittings of the present invention differ from "press fit" installation fittings insofar as they are not integrally formed with a securing arrangement. Rather they are employed with discrete WO 2012/137197 induction weldable pipe connector for in situ assembly. The installation fittings of the present invention can be supplied in a wide range similar to "press fit" installation fittings, namely, couplers, elbow fittings, T fittings, Y fittings, X fittings, and the like.

Another aspect of the present invention is directed towards induction weldable pipe connectors of the present invention having a minor lateral pipe connector section pair of reduced thickness compared to a major central pipe connector section such that the former absorb less induction energy than the latter per unit length, thereby ensuring the major central pipe connector section is induction heated to a higher temperature than the minor lateral pipe connector section pair.

Yet another aspect of the present invention is directed towards induction weldable pipe connectors with integral solder flow barrier for use in assembling fluid distribution systems. The integral solder flow barriers are mounted inside induction weldable pipe connectors and designed to control the inward radial flow of melted internal thermoplastic solder lining on application of induction energy thereby affording a more precise induction welding operation. Induction weldable pipe connectors with integral solder flow barriers according to the present invention can be tailored for assembling either thermoplastic pipes or plastic pipes having inherent mechanical rigidity either by virtue of being made of thermoset plastic materials or having an aluminium core layer.

In the former case of thermoplastic pipes, an integral solder flow barrier is additionally intended to provide structural rigidity to pipe ends undergoing induction welding and therefore it is necessarily longer than its associated induction weldable pipe connector to extend to unheated lengths of the pipe ends being induction welded together. Integral solder flow barriers for use with thermoplastic pipes can be made of a thermoset plastic material having a higher melting temperature than an internal thermoplastic solder lining such that it is not affected during an induction welding operation. Alternatively, integral solder flow barriers can be made from a dissolvable material intended to be dissolved by a fluid flowing through a fluid distribution system. Suitable dissolvable materials include common salt.

In the latter case of plastic pipes having inherent mechanical rigidity, an integral solder flow barrier can be considerably shorter than its associated induction weldable pipe connector, thereby saving dissolvable material in the case of a dissolvable integral solder flow barrier. Flow control over melting internal thermoplastic solder lining is particularly important in the case of multi-layer pipes with aluminium core layers to ensure that the melting internal thermoplastic solder lining material absolutely seals the annular aluminium core end faces to preclude their oxidation which can lead to pipe failure.

Still another aspect of the present invention is directed towards ElectroMagnetic Induction (EMI) coil reverse action pliers for use with a power supply for assembling fluid distribution systems. The pliers include a lever pair pivoted at a fulcrum to form a long handle pair designed to be comfortably hand gripped by a user and a short jaw pair. The jaw pair is normally biased by a biasing member, for example, a spring, and the like, into a closed position to form a coil housing shaped and dimensioned for enveloping an induction weldable pipe connector ready for an induction welding operation. The jaw pair can be opened on manually squeezing the handle pair together. The pliers can employ EMI coil assemblies of the aforementioned WO 2012/137197 for providing a near uniform electromagnetic field intensity for induction heating an induction weld pipe connector.

BRIEF DESCRIPTION OF DRAWINGS

In order to understand the invention and to see how it can be carried out in practice, preferred embodiments will now be described, by way of non-limiting examples only, with reference to the accompanying drawings in which similar parts are likewise numbered, and in which:

FIG. 15 is a perspective view of a pre-assembled assemblage of the FIG. 14 pipe end, an induction weldable pipe connector, and a multi-layer pipe;
FIG. 16 is a longitudinal cross section of the FIG. 15 induction weldable pipe connector along line 16-16 in FIG. 15.

DETAILED DESCRIPTION OF PREFERRED EMBODIMENTS OF THE INVENTION

Figure 1:
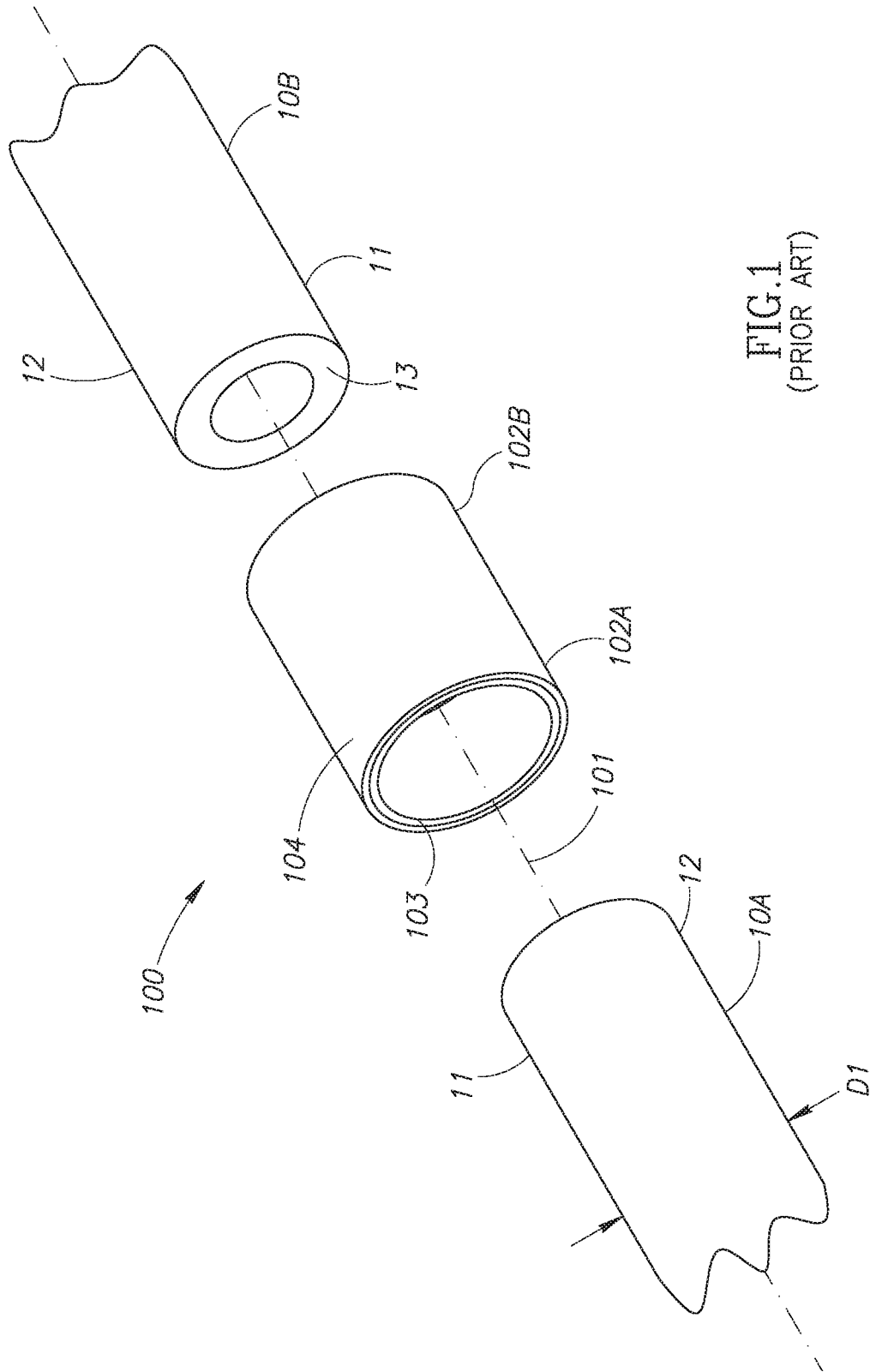
FIG. 1 corresponds to aforesaid WO 2012/137197 FIG. 1.
Figure 2:
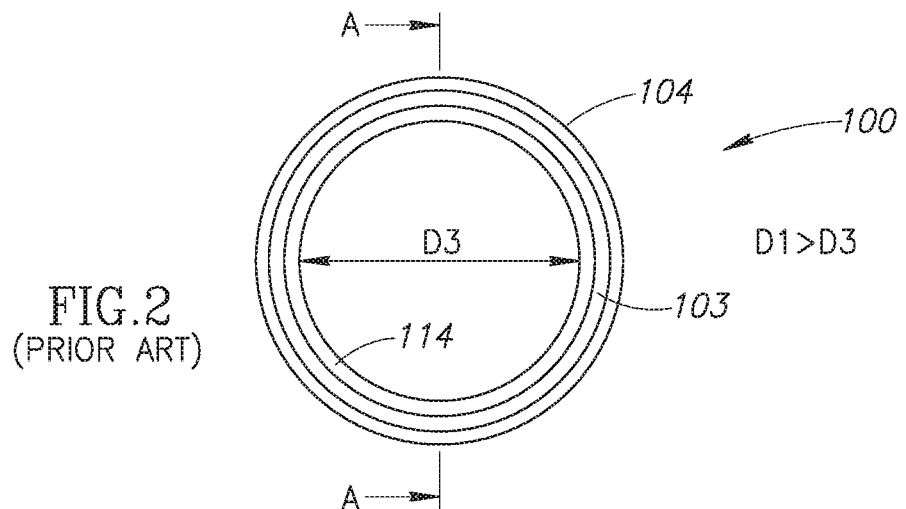
FIG. 2 corresponds to aforesaid WO 2012/137197 FIG. 2.

Section 1: WO 2012/137197 Electromagnetic Induction Welding of Plastic Pipe Distribution Systems Commonly owned WO 2012/137197 FIGS. 1 to 4 show an induction weldable pipe connector 100 for electromagnetic induction welding to a pair of same diameter thermoplastic pipes 10. The thermoplastic pipes 10 have an external diameter D1 typically in the range of from 10 mm to 30 mm. The thermoplastic pipes 10 have pipe ends 11. The pipe ends 11 have peripheral external pipe end surfaces 12 and exposed annular pipe end faces 13.

The induction weldable pipe connector 100 has a longitudinal pipe connector axis 101 and includes two opposite induction weldable pipe sockets 102A and 102B each intended for forced sliding insertion of a pipe end 11 thereinto. The induction weldable pipe connector 100 has a two ply construction including an internal thermoplastic solder lining 103 and a solid ferromagnetic metal susceptor sleeve 104 entirely peripherally enveloping the internal thermoplastic solder lining 103.

The solder lining 103 has a patterned external solder lining surface 106, an internal solder lining surface 107 and a pair of solder lining end faces 108. The solder lining 103 is made of thermoplastic material for welding with thermoplastic pipes 10. The solder lining 103 has an internal diameter D2. The diameters D1 and D2 are such that a pipe end 11 requires forced sliding inserted into a pipe socket 102 for preloading same. Such preloading ensures that melting of solder lining 103 leads in turn to melting of the peripheral external pipe end surfaces 12 thereby welding them together.

The susceptor sleeve 104 is preferably formed from steel to ensure uniform heating of its solder lining 103. The susceptor sleeve 104 has an external susceptor sleeve surface 109, a patterned internal susceptor sleeve surface 111 and a pair of susceptor sleeve end faces 112. The external susceptor sleeve surface 109 is an exposed metal surface which can be printed with technical specification details including inter alia length, internal diameter, external diameter, and the like.

Figure 3:
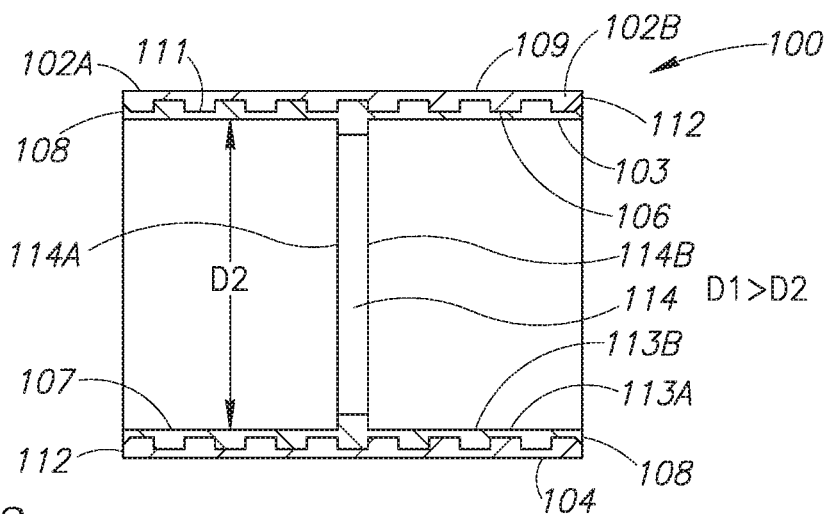
FIG. 3 corresponds to aforesaid WO 2012/137197 FIG. 3.
Figure 4:
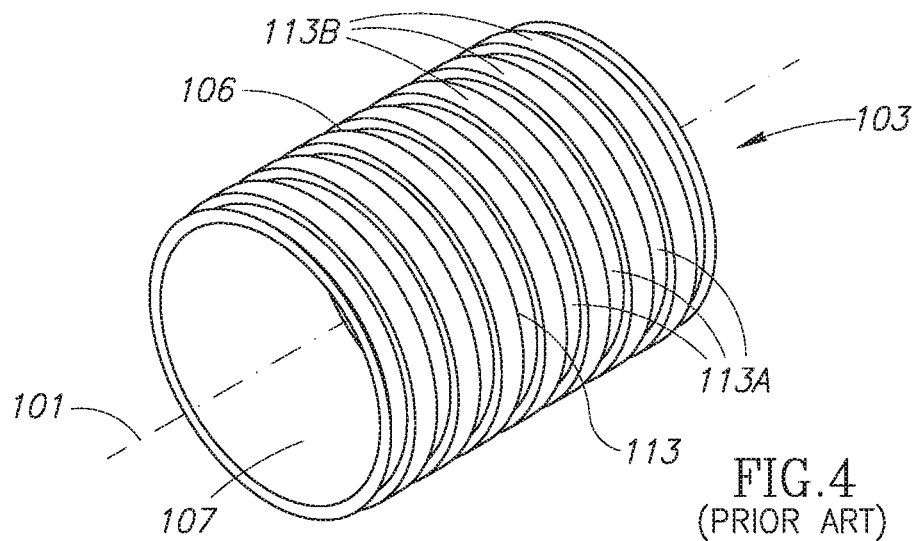
FIG. 4 corresponds to aforesaid WO 2012/137197 FIG. 4.

The patterned external solder lining surface 106 and the patterned internal susceptor sleeve surface 111 are in intimate complementary interlocking contact to facilitate heat transfer from the susceptor sleeve 104 to the solder lining 103. FIGS. 3 and 4 show a series of staggered different diameter adjacent rings 113 along the longitudinal pipe connector axis 101. Alternative interlocking patterns include inter alia castellated surfaces, grooved surfaces, and the like.

The solder lining 103 is formed with a central inwardly directed stop 114 having an internal diameter D3 wherein D1>D2>D3 such that the pipe ends 11 stop against the inwardly directed stop 114 on their forced sliding insertion into the pipe connector 100. The inwardly directed stop 114 includes a first abutment surface 114A facing the induction weldable pipe socket 102A and a second abutment surface 114B facing the induction weldable pipe socket 102B. The inwardly directed stop 114 is preferably annular.

Figure 5:
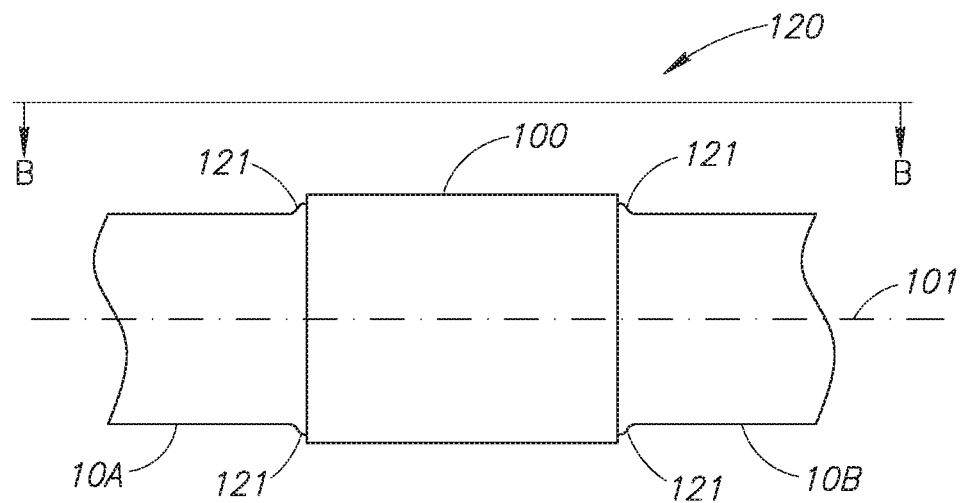
FIG. 5 corresponds to aforesaid WO 2012/137197 FIG. 5.
Figure 6:
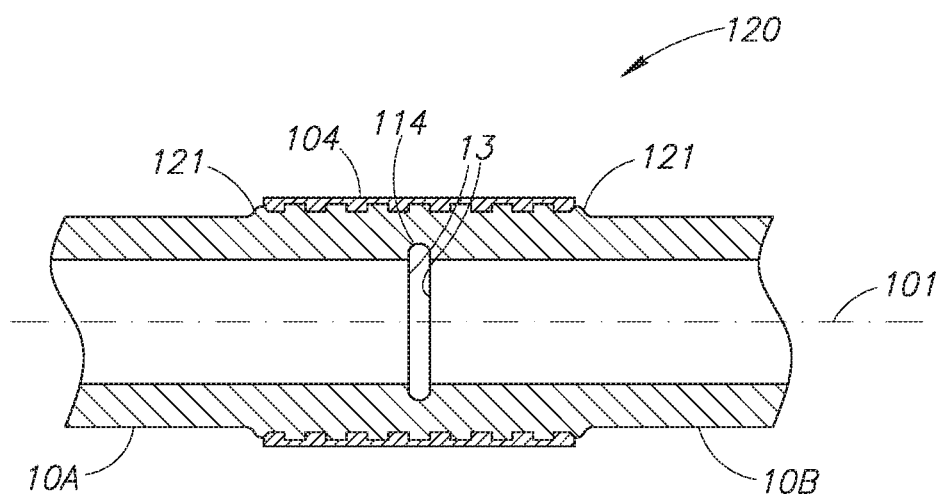
FIG. 6 corresponds to aforesaid WO 2012/137197 FIG. 6 and is a longitudinal cross section along line B-B in FIG. 5.

Electromagnetic induction welding of the induction weldable pipe connector 100 and the two thermoplastic pipes 10 is now described with reference to FIGS. 5 and 6: The pipe ends 11 are forcibly inserted into the opposite pipe sockets 102 to preload same. The annular pipe end faces 13 abut on opposite sides against the central inwardly directed stop 114.

An electromagnetic induction coil (not shown) is placed over the newly formed assemblage and radio frequency electric current is fed to the electromagnetic induction coil. The electromagnetic induction coil generates an electromagnetic field which induces the susceptor sleeve 104 to absorb electromagnetic energy. The susceptor sleeve 104 heats up and concurrently heats the solder lining 103. The solder lining 103 begins to melt as do the peripheral external pipe end surfaces 12 such that the induction weldable pipe connector 100 and the pipe ends 11 together form a welded sealed joint 120. The solder lining 103 also expands as it melts as evidenced by melted thermoplastic material from the solder lining 103 exuding beyond the susceptor sleeve end faces 112 to form annular thermoplastic extrusions 121 on either side of the welded sealed joint 120.

Figure 7:
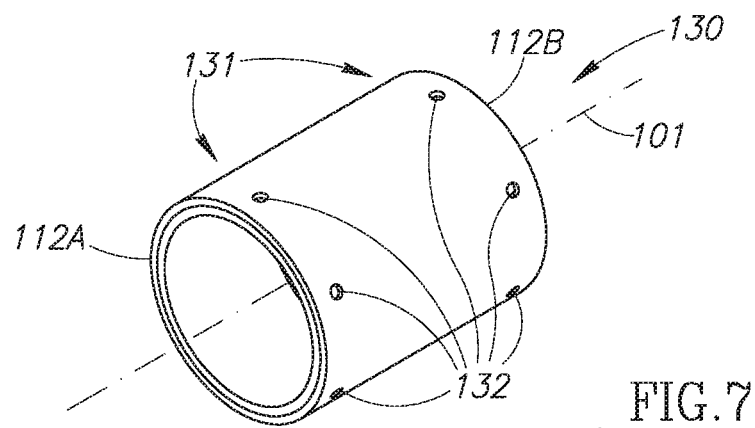
FIG. 7 corresponds to aforesaid WO 2012/137197 FIG. 7.
Figure 8:
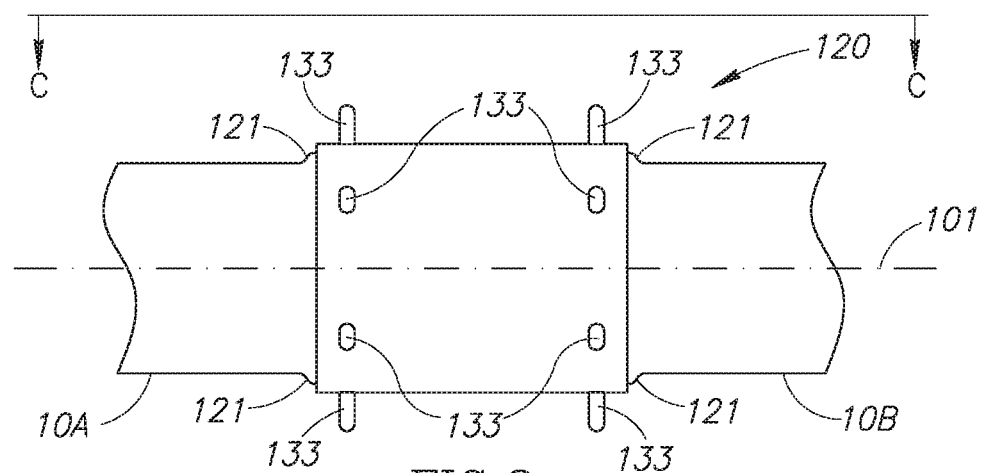
FIG. 8 corresponds to aforesaid WO 2012/137197 FIG. 8.
Figure 9:
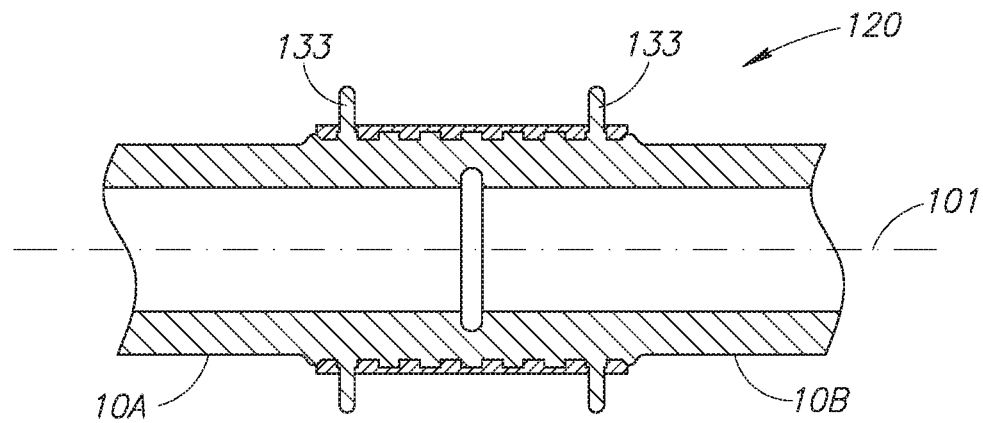
FIG. 9 corresponds to aforesaid WO 2012/137197 FIG. 9 and is a longitudinal cross section along line C-C in FIG. 8.

Commonly owned WO 2012/137197 FIG. 7 shows an induction weldable pipe connector 130 similar to the induction weldable pipe connector 100 and therefore similar parts are likewise numbered. The former 130 differs from the latter 100 insofar the former 130 includes a susceptor sleeve 104 having a series 131 of radial small diameter inspection apertures 132 slightly inwards of its left susceptor sleeve end surface 112A and a series 131 of radial small diameter inspection apertures 132 slightly inwards of its right susceptor sleeve end surface 112B. FIGS. 8 and 9 show the welded sealed joint 120 including the annular thermoplastic extrusions 121 and additionally outward radial protrusions 133 formed from the solder lining 103 protruding through the inspection apertures 132.

Section 2: "Press Fit" Installation Fittings for Assembling Multi-layer Pipe Fluid Distribution Systems FIG. 10 shows a T-shaped "press fit" installation fitting 200 for connecting three same diameter multi-layer pipes 20.

Figure 11:
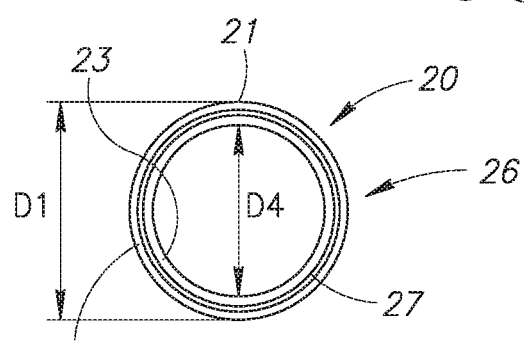
FIG. 11 is an end elevation view of a multi-layer pipe.

FIG. 11 shows multi-layer pipe 20 has a triple layer construction including an external plastic layer 21, an aluminum core layer 22, and an internal plastic layer 23. The multi-layer pipe 20 has an external pipe diameter D1 the same as the plastic pipe 10 and an internal pipe diameter D4. The multi-layer pipe 20 includes a pipe end 24 and an exposed annular pipe end face 26 with an annular aluminum core end face 27 which is prone to oxidation.

Figure 10:
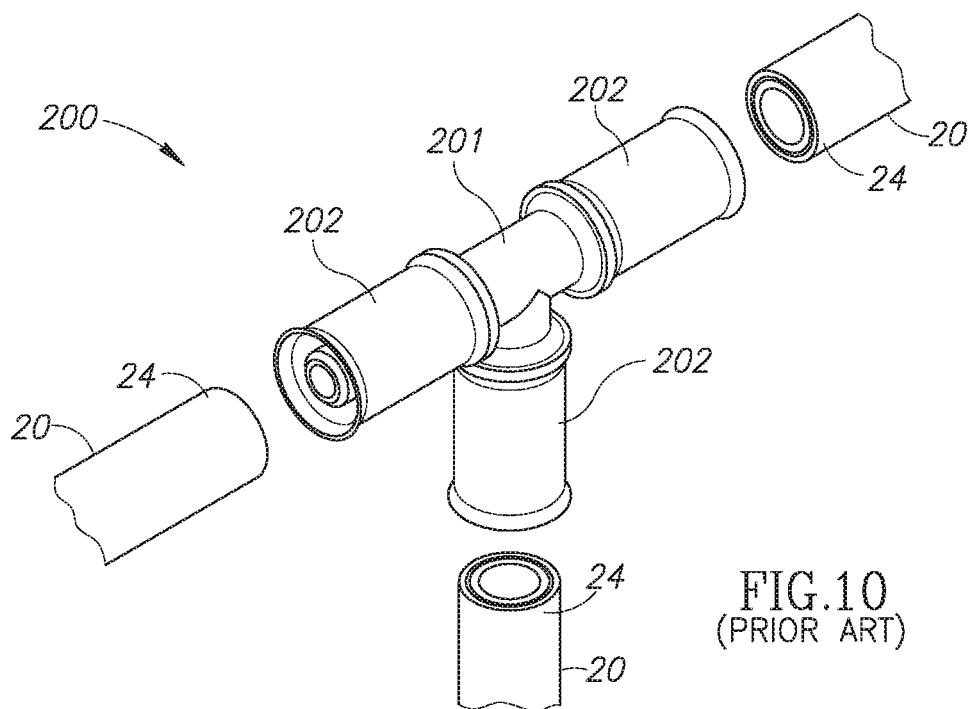
FIG. 10 is a perspective view of a conventional T-shaped "press fit" installation fitting for connecting three same diameter multi-layer pipes.
Figure 12:
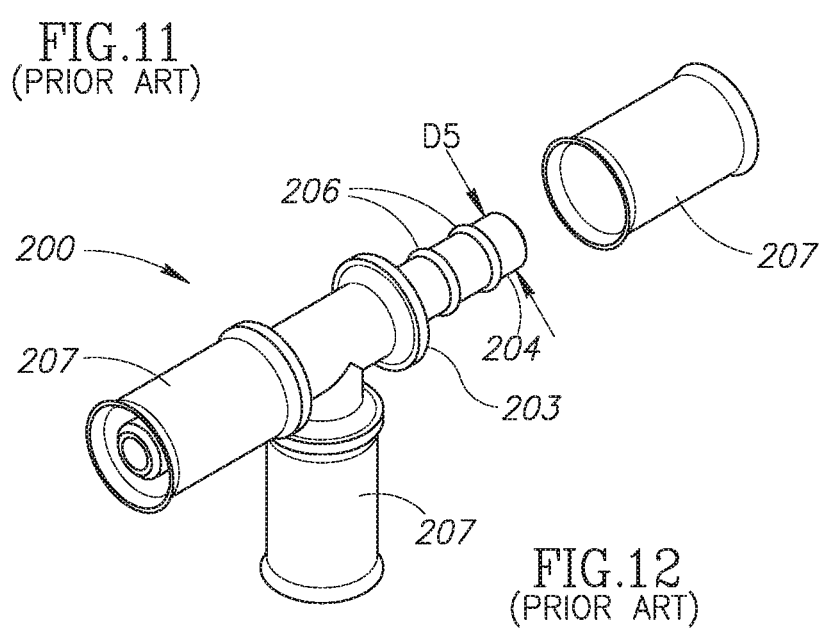
FIG. 12 is a partially exploded view of the T-shaped "press fit" installation fitting.

FIGS. 10 and 12 show the T-shaped "press fit" installation fitting 200 includes a T-shaped housing 201 having three pipe sockets 202 for each sealingly receiving a pipe end 24 on forced sliding insertion thereinto. Each pipe socket 202 includes an annular abutment element 203 mounted on a pipe tang 204 with two or more O-rings 206. The pipe tang 204 has an external diameter D5. The pipe sockets 202 and the pipe tangs 204 are dimensioned such that a multi-layer pipe 20 requires forced sliding insertion into a pipe socket 202 for ensuring the O rings 206 seal against the internal plastic layer 23. The pipe ends 24 are inserted into the pipe sockets 202 until abutment against the abutment element 203. Each press fit socket 202 includes a sleeve 207 intended to be pressed onto a pipe end 24 in a pressing operation for securing purposes.

Figure 13:
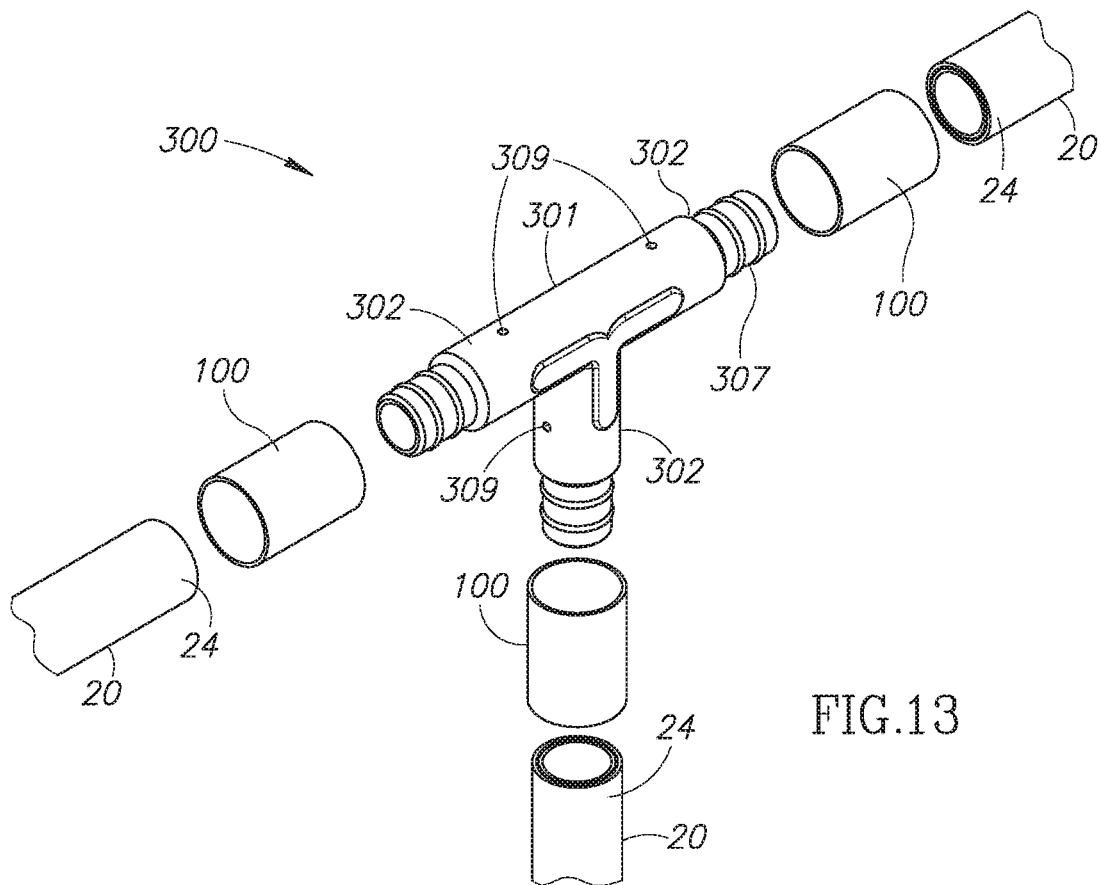
FIG. 13 is a perspective view of a T-shaped installation fitting in accordance with the teachings of the present invention for use with three induction weldable pipe connectors for connecting three same diameter multi-layer pipes.
Figure 14:
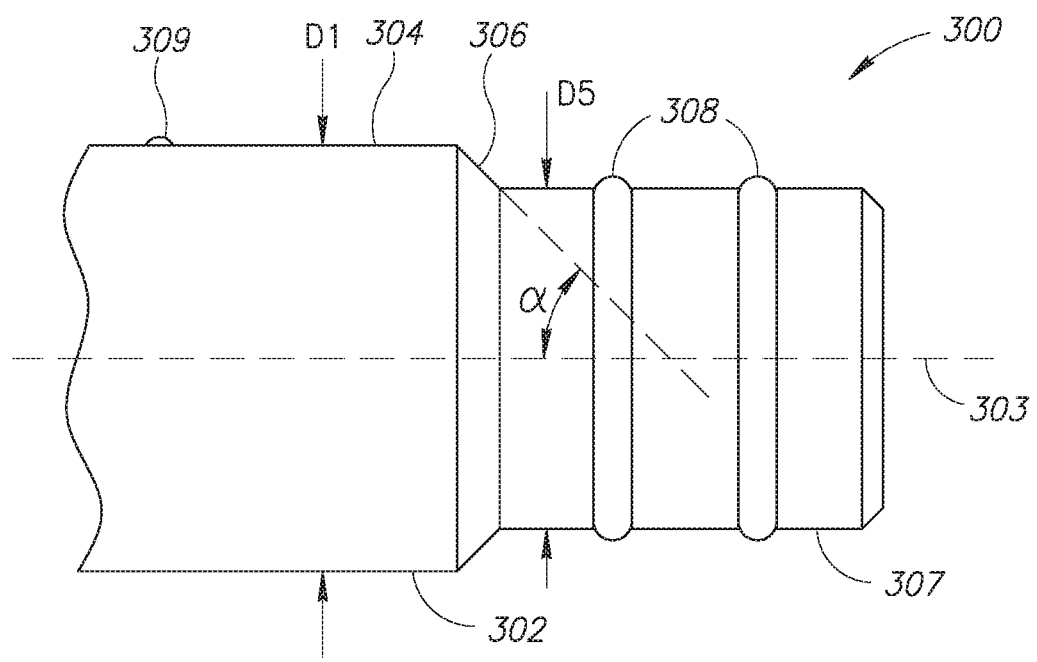
FIG. 14 is a front elevation view of a pipe end of the FIG. 13 T-shaped installation fitting.

Section 3: Plastic Installation Fittings for Induction Welding Multi-layer Pipe Fluid Distribution Systems FIGS. 13 and 14 show a T-shaped installation fitting 300 for connecting the three same diameter multi-layer pipes 20 as the T-shaped "press fit" installation fitting 200. The T-shaped installation fitting 300 requires the use of discrete induction weldable pipe connectors for assembly purposes in contradistinction to the T-shaped "press fit" installation fitting 200 which includes the integral sleeves 207 for securing purposes. The multi-layer pipes 20 are equivalent to the plastic pipes 10 in terms of induction welding insofar as they include the external plastic layer 21. The T-shaped installation fitting 300 can be made entirely from thermoplastic material or thermosetting plastic material except for conventional O rings used for sealing against the internal plastic layer 23. The T-shaped installation fitting 300 can be assembled with the WO 2012/137197 induction weldable pipe connectors. Alternatively, the T-shaped installation fitting 300 can be assembled with induction weldable pipe connectors 140 described hereinbelow.

The T-shaped installation fitting 300 includes a housing 301 having three tubular plastic pipe ends 302. Each pipe end 302 has a pipe end centerline 303 and an exposed external peripheral plastic surface 304 co-directional with the pipe end centerline 303. The pipe end 302 has a shoulder 306 converging to a tubular pipe tang 307. The pipe tang 307 is provided with at least two O rings 308 similar to the pipe tang 204. The pipe end 302 preferably tapers to the pipe tang 307 such that the shoulder 306 subtends an included acute angle $\alpha$ with the pipe end centerline 303 in FIG. 14's front elevation view. The included acute angle $\alpha$ is preferably within the range of 45°±10°. Alternatively, the shoulder 306 can form a right angle with the pipe tang 307 such that the exposed external peripheral plastic surface 304 has a stepped configuration. The pipe end 302 includes a full insertion indicator 309 for providing a visual user indication that a pipe end 302 has been fully inserted into an injection weldable pipe connector when the full insertion indicator 309 is adjacent thereto.

The pipe end 302 is shaped and dimensioned for forced sliding insertion into an induction weldable pipe socket 102 similar to a pipe end 24. The pipe tang 307 is shaped and dimensioned for forced sliding insertion into a multi-layer pipe 20 such that its O rings 308 sealing contact with the internal plastic surface 23. Accordingly, the pipe end 302 has an external pipe diameter D1 similar to the multi-layer pipe 20 and the pipe tang 307 has an external diameter D5 similar to the pipe tang 204.

Section 4: Induction Weldable Pipe Connector Having Major Central Pipe Connector Section and Reduced Thickness Minor Lateral Pipe Connector Section Pair FIGS. 15 and 16 show an induction weldable pipe connector 140 differs from the WO 2012/137197 induction weldable pipe connectors insofar as they include a major central pipe connector section 141 and a minor lateral pipe connector section pair 142 respectively at the induction weldable pipe socket pair 102. The induction weldable pipe connector 140 has a length L1, the major central pipe connector section 141 has a length L2 and each minor lateral pipe connector section 142 has a length L3 wherein L1=L2+2 L3 and L2>½ L1.

The major central pipe connector section 141 has a thickness T1 and the each minor lateral pipe connector section 142 has a thickness T2 wherein T2<T1. Each minor lateral pipe connector section 142 is of reduced thickness compared to the major central connector section 141 such that they absorb less induction energy than the major central pipe connector section 141 per unit length, thereby ensuring the major central pipe connector section 141 is induction heated to a higher temperature than the minor lateral pipe connector section pair 142. Typically T2≈½ T1. The minor lateral pipe connector section pair 142 is preferably formed with the radial small diameter apertures 132.

Section 5: Induction Welding of Multi-layer Pipe Fluid Distribution Systems

Figure 17:
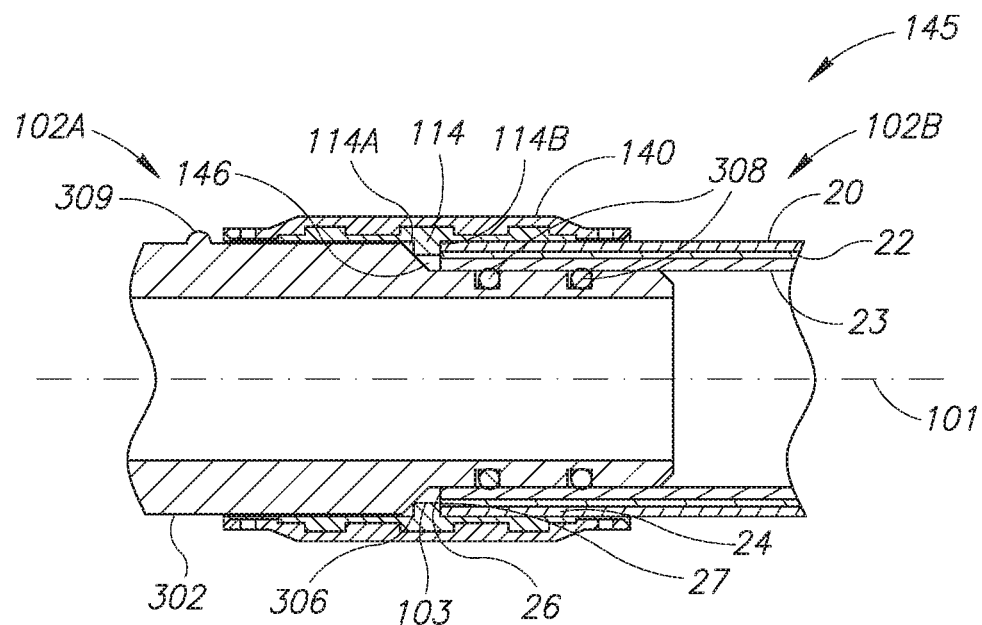
FIG. 17 is a close-up longitudinal cross section of a pre-welded joint of the assembled FIG. 15 assemblage of the pipe end, the induction weldable pipe connector, and the multi-layer pipe.

FIG. 17 shows a pre-welded joint 145 of the pipe end 302, the induction weldable pipe connector 140, and the multi-layer pipe 20. The pipe end 302 is inserted into the induction weldable pipe socket 102A until abutment of the shoulder 306 against the first annular abutment surface 114A. The multi-layer pipe 20 is inserted into the induction weldable pipe socket 102B until abutment against the second annular abutment surface 114B. Sliding insertion of the pipe end 302 and the multi-layer pipe 20 into the induction weldable pipe connector 140 sealingly slides the pipe tang 307 into the multi-layer pipe 20 by virtue of the O rings 308 sealingly engaging the internal plastic layer 23. The pre-welded joint 145 includes a circular cavity 146 bound by the shoulder 306, the internal thermoplastic solder lining 103 and the exposed annular pipe end surface 26.

Figure 18:
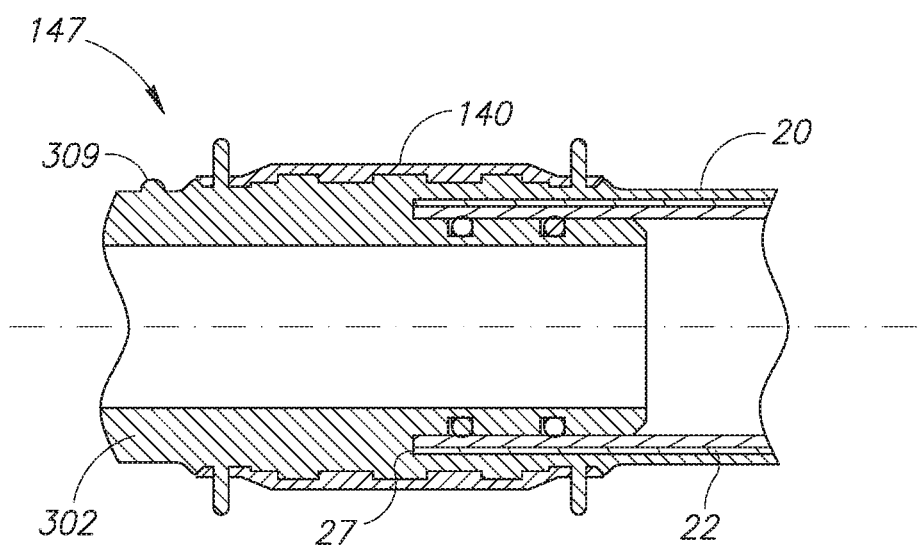
FIG. 18 is a close-up longitudinal cross section of a welded sealed joint of the assembled FIG. 15 assemblage of the pipe end, the induction weldable pipe connector, and the multi-layer pipe.

FIG. 18 shows a welded sealed joint 147 subsequent to application of induction energy to the pre-welded joint 145 in a similar manner as explained in aforesaid WO 2012/137197. The internal thermoplastic solder lining 103 melts to form the annular plastic extrusions forms 121 and the outward radial protrusions 133 as described hereinabove with reference to WO 2012/137197 FIGS. 7 to 9. The internal thermoplastic solder lining 103 also melts and flows radially inwards towards the pipe tang 307 to fill the circular cavity 146 for sealing the annular aluminum core end surface 27. Such sealing provides additional protection against oxidation of the aluminum core layer 22.

Figure 19:
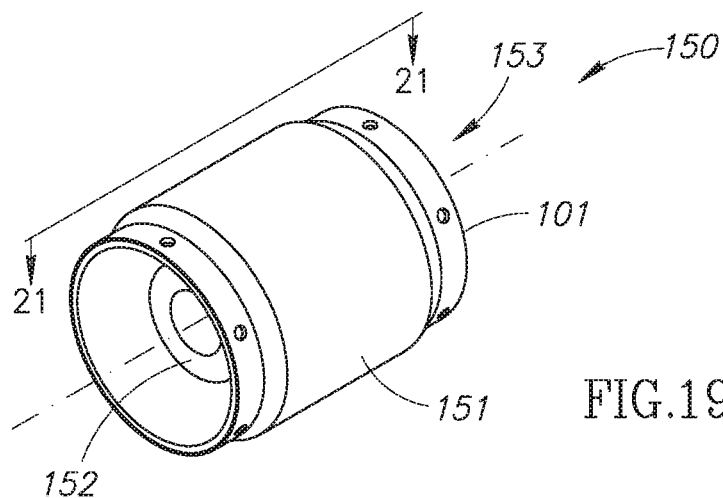
FIG. 19 is a perspective view of an induction weldable pipe connector with integral solder flow barrier for use during end to end induction welding of two same diameter plastic pipes with inherent mechanical rigidity.
Figure 20:
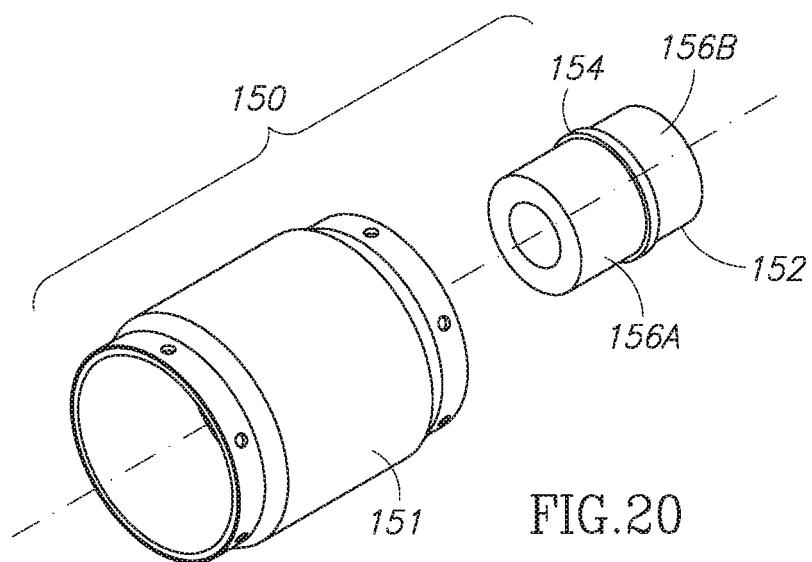
FIG. 20 is an exploded view of the FIG. 19 induction weldable pipe connector.
Figure 21:
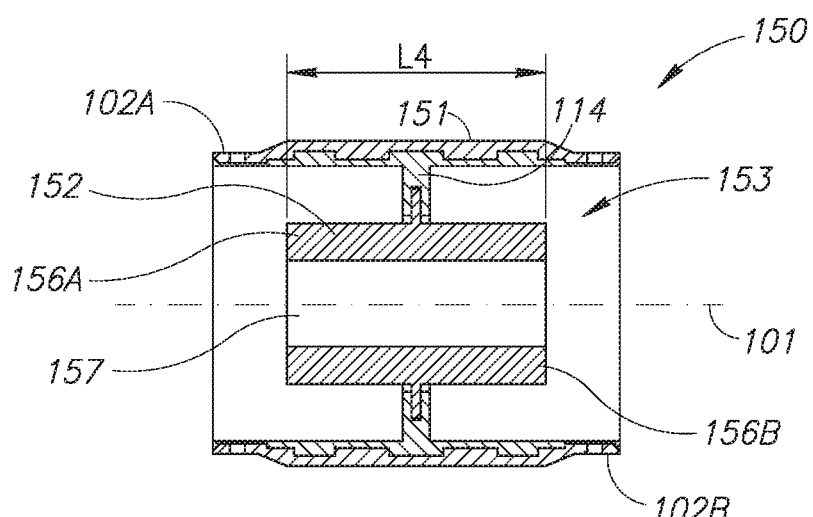
FIG. 21 is a longitudinal cross section of the FIG. 19 induction weldable pipe connector along line 21-21 in FIG. 19.

Section 6: Induction Weldable Pipe Connectors with Integral Solder Flow Barrier For End to End Induction Welding Plastic Pipes with Inherent Mechanical Rigidity FIGS. 19 to 21 show an induction weldable pipe connector with integral solder flow barrier 150 (hereinafter referred to as "assisted induction weldable pipe connector") for end to end induction welding of two plastic pipes with inherent mechanical rigidity. Such plastic pipes include multi-layer pipes 20 with an aluminium core layer, thermosetting plastic pipes, and the like. The assisted induction weldable pipe connector 150 is modified from the induction weldable pipe connector 140. Alternatively, an assisted induction weldable pipe connector can be modified from WO 2012/137197 induction weldable pipe connectors 100 and 130.

The assisted induction weldable pipe connector 150 includes an induction weldable pipe connector 151, a solder flow barrier 152 and a mounting arrangement 153 for mounting the solder flow barrier 152 inside the induction weldable pipe connector 151. The solder flow barrier 152 includes a central flange 154 employed by the mounting arrangement 153. Suitable mounting arrangements 153 include inter alia a mechanical arrangement, gluing, and the like. The solder flow barrier 152 is preferably formed from a dissolvable material for initially assisting an induction welding operation of two multi-layer pipes 20 before being dissolved pursuant to fluid flowing therethrough.

The assisted induction weldable pipe connector 150 has the same length L1 as the induction weldable pipe connector 140 and the solder flow barrier 152 has a length L4 wherein L4<L1. Typically L4≈½ L1. The solder flow barrier 152 includes a pipe tang pair 156 corresponding with the induction weldable pipe socket pair 102. The pipe tang pair 156 has an external diameter D5 similar to the pipe tangs 204 and 307 for the same purpose of sealing against the internal plastic layer 23. The solder flow barrier 152 preferably includes a throughgoing bore 157 co-directional with the longitudinal pipe connector axis 101.

Figure 22A:
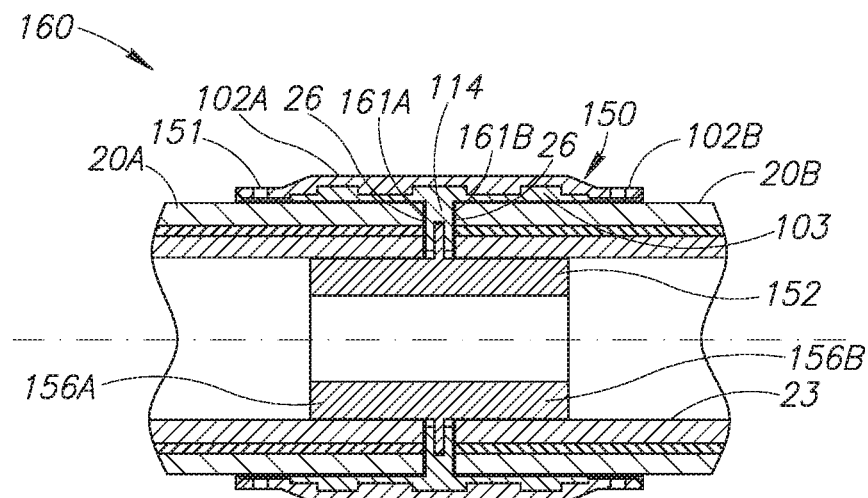
FIGS. 22A to 22C show the use of the FIG. 19 induction weldable pipe connector for end to end induction welding of two same diameter multi-layer pipes.
Figure 22B:
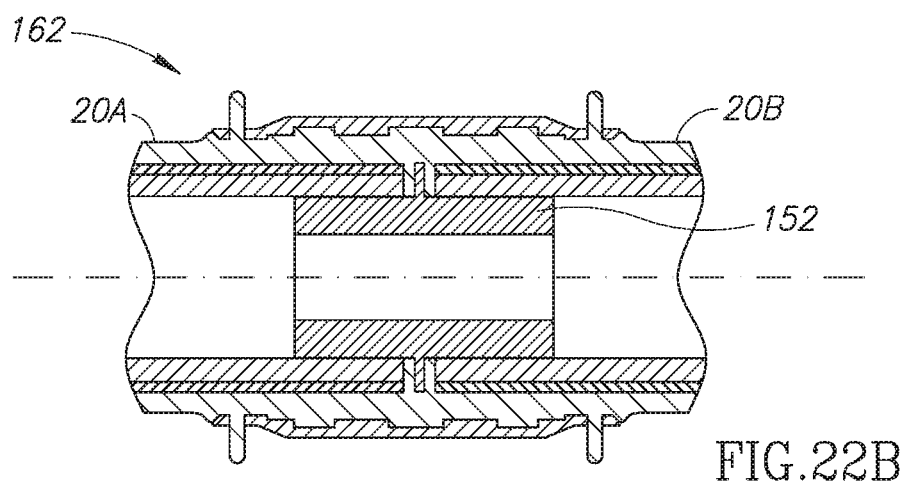
Figure 22C:
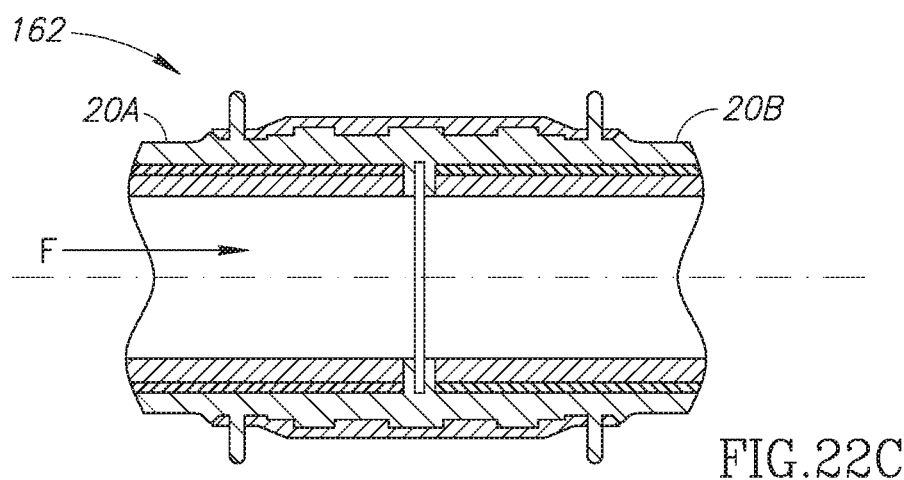

FIG. 22A to FIG. 22C show the use of the assisted induction weldable pipe connector 150 for end to end induction welding two multi-layer pipes 20.

FIG. 22A shows a pre-welded joint 160 of the assisted induction weldable pipe connector 150 and the multi-layer pipes 20 on forced sliding insertion of the multi-layer pipes 20 into opposite induction weldable pipe sockets 102 until abutment of their respective exposed annular pipe end faces 26 against the central inwardly directed stop 114. The pipe tang pair 156 is slidingly inserted into the pipe ends 24. The annular pipe end faces 26 and the assisted induction weldable pipe connector 150 form annular contact zones 161A and 161B externally 20 bound by the internal thermoplastic solder lining 103 and internally bound by the solder flow barrier 152. The annular contact zones 161A and 161B contain minute cavities due to surface contact tolerances between the exposed annular pipe end faces 26 and the abutment surfaces 114A and 114B.

FIG. 22B shows a welded sealed joint 162 subsequent to application of induction 25 energy to the pre-welded joint 160 in a similar manner as explained in aforesaid WO 2012/137197. The internal thermoplastic soldering lining 103 melts and expands to flow radially inwards towards the solder flow barrier 152 and also peripherally along the pipe end 302 and the multi-layer pipe 20 to form annular thermoplastic extrusions 121. Such inward expansion fills the annular contact zones 161 thereby hermetically sealing the opposite annular aluminum core 30 end surfaces 27 instead of O ring protection to prevent their oxidation.

FIG. 22C shows the welded sealed joint 162 after the solder flow barrier 152 has been dissolved by fluid F flowing through the multi-layer pipes 20.

Figure 23:
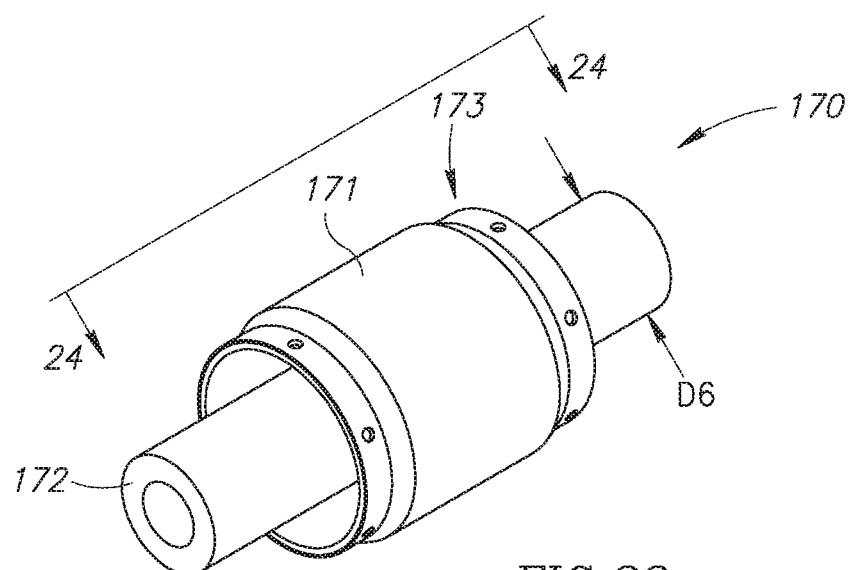
FIG. 23 is a perspective view of an induction weldable pipe connector with integral solder flow barrier made from dissolvable material for use during end to end induction welding of two same diameter thermoplastic pipes.
Figure 24:
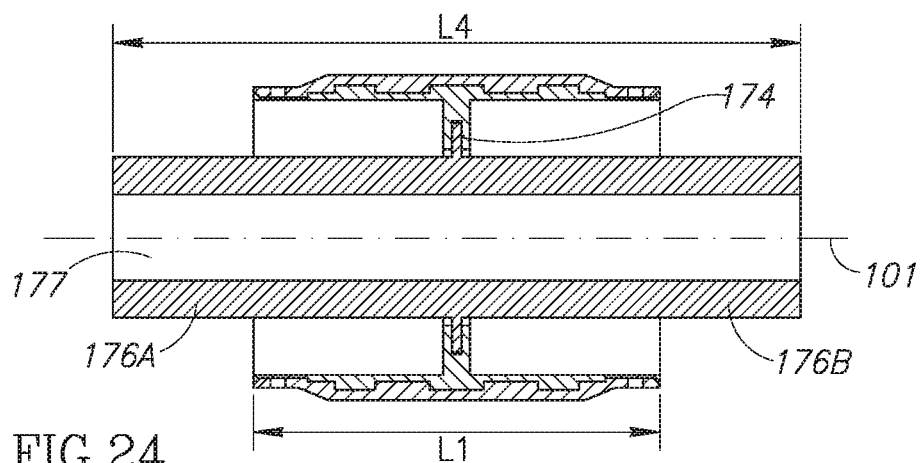
FIG. 24 is a longitudinal cross section of the FIG. 23 induction weldable pipe connector with integral solder flow barrier along line 24-24 in FIG. 23.

Section 7: Induction Weldable Pipe Connectors with Integral Solder Flow Barrier For End to End Induction Welding Thermoplastic Pipes FIGS. 23 and 24 show an induction weldable pipe connector with integral solder flow barrier 170 (hereinafter referred to as "assisted induction weldable pipe connector") for end to end induction welding of two same diameter thermoplastic pipes 10. The assisted induction weldable pipe connector 170 has the same construction and use as the assisted induction weldable pipe connector 150. The assisted induction weldable pipe connector 170 includes an induction weldable pipe connector 171, a solder flow barrier 172 and a mounting arrangement 173 for mounting the solder flow barrier 172 inside the induction weldable pipe connector 171. The solder flow barrier 172 includes a central flange 174 employed by the mounting arrangement 173 and a pipe tang pair 176 corresponding with the induction weldable pipe socket pair 102. The pipe tang pair 176 has an external diameter D6 for forced sliding insertion into the thermoplastic pipes 10. The solder flow barrier 172 preferably includes a throughgoing bore 177 co-directional with the longitudinal pipe connector axis 101.

The assisted induction weldable pipe connector 170 has the same length L1 as the induction weldable pipe connector 140 and the solder flow barrier 172 has a length L4 wherein L4>L1. The solder flow barrier 172 is longer than the induction weldable pipe connector 171 since in addition to controlling the radial inward directed flow of melted solder lining from the internal thermoplastic solder lining 103 towards the solder flow barrier 172 similar to the solder flow barrier 152, the solder flow barrier 172 provides mechanical support for the two thermoplastic pipes 10 which is not required in the case of plastic pipes having inherent mechanical rigidity. Thus, the solder flow barrier 172 necessarily has to extend to unheated lengths of the pipe ends 11. Typically L4≈1.5 L1.

Figure 25:
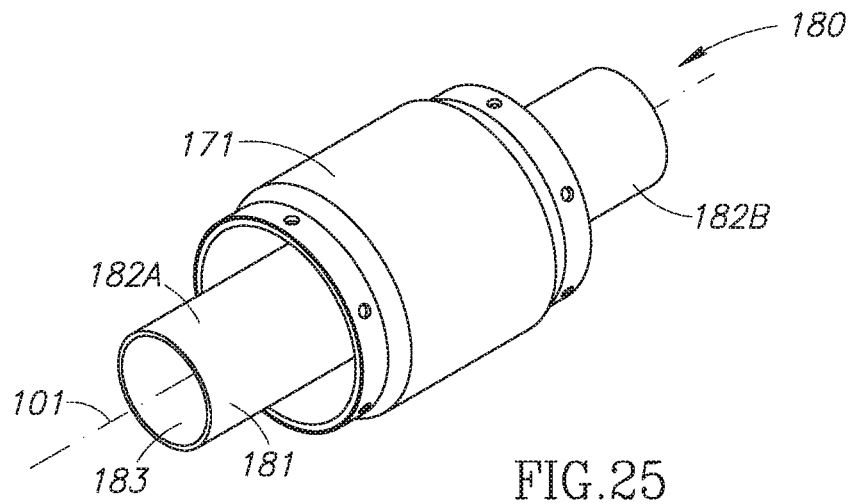
FIG. 25 is a perspective view of an induction weldable pipe connector with integral solder flow barrier made from thermoset plastic material for use during end to end induction welding of two same diameter thermoplastic pipes.

FIG. 25 shows an induction weldable pipe connector with integral solder flow barrier 180 (hereinafter referred to as "assisted induction weldable pipe connector") for use during end to end induction welding of two same diameter thermoplastic pipes 10. The assisted induction weldable pipe connector 180 has a similar construction and use as the assisted induction weldable pipe connector 170. The latter 180 differs from the former 170 insofar as the latter 180 includes a solder flow barrier 181 formed from a thermosetting plastic material instead of dissolvable material. The solder flow barrier 181 has a pipe tang pair 182 corresponding with the induction weldable pipe socket pair 102. The thermosetting plastic material has a melting temperature considerably higher than the melting temperature of the internal thermoplastic solder lining 103 such that it does not melt during an induction welding operation. The solder flow barrier 181 is a permanent component in the assisted induction weldable pipe connector 180 and therefore is preferably made as thin as possible on the one hand to provide the required mechanical support during an induction welding operation and on the other hand to minimize narrowing the internal diameter of the assisted induction weldable pipe connector 180. The solder slow barrier 181 has a longitudinal throughgoing bore 183 co-directional with longitudinal pipe connector axis 101.

Figure 26A:
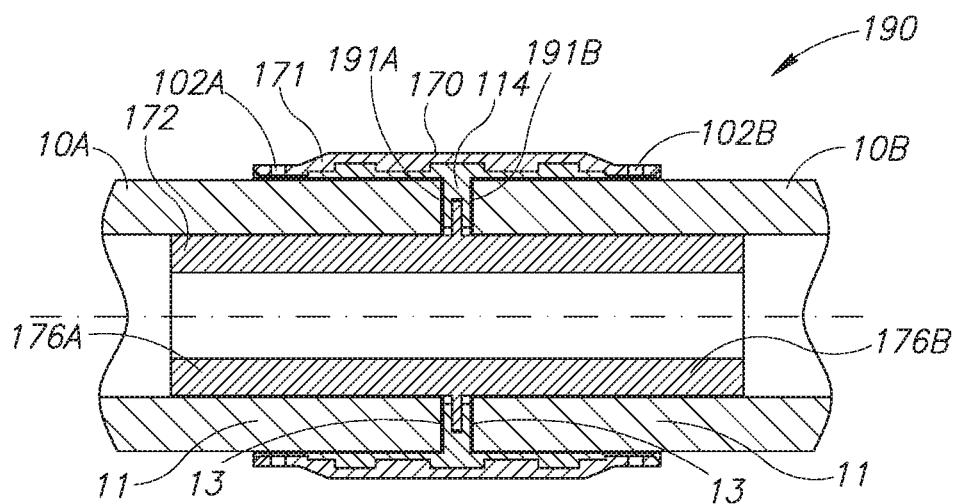
FIGS. 26A to 26C show the use of the FIG. 23 induction weldable pipe connector for end to end welding of two same diameter thermoplastic pipes.
Figure 26B:
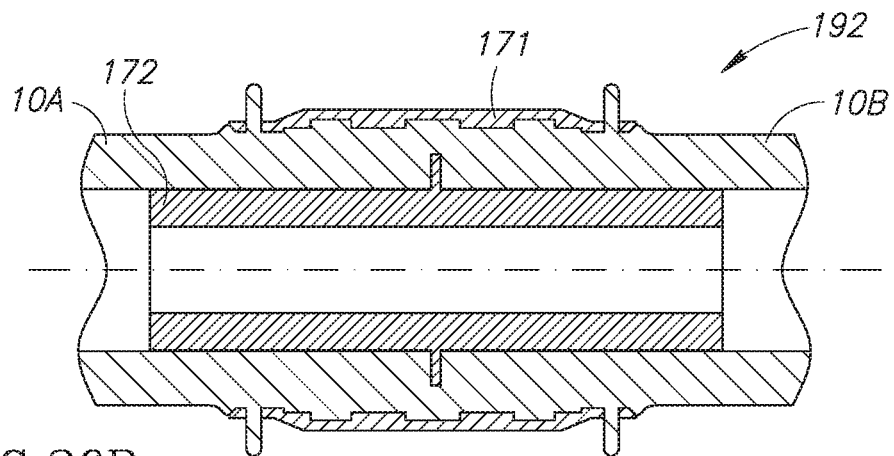
Figure 26C:
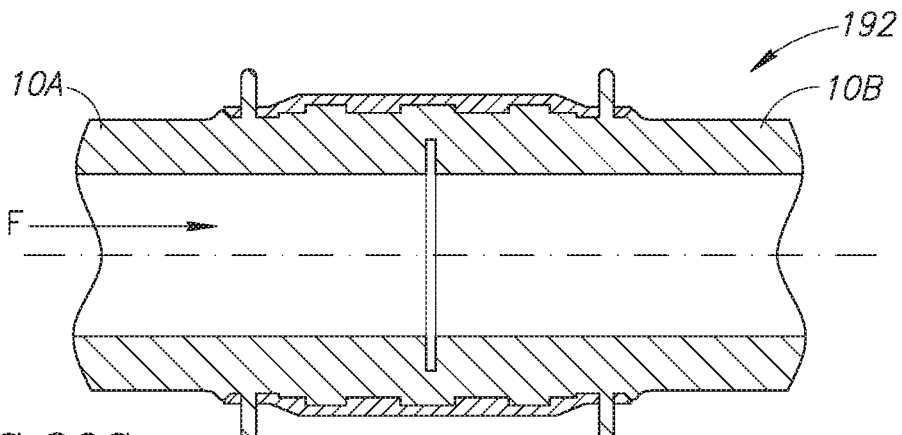

FIG. 26A to FIG. 26C show the use of the assisted induction weldable pipe connector 170 for end to end induction welding of two same diameter thermoplastic pipes 10.

FIG. 26A shows a pre-welded joint 190 of the assisted induction weldable pipe connector 170 and the thermoplastic pipes 10 on forced sliding insertion of the thermoplastic pipes 10 into opposite induction weldable pipe sockets 102 until abutment of their respective exposed annular end faces 13 against the central inwardly directed stop 114. The pipe tang pair 176 is slidingly inserted into the pipe ends 11. The exposed annular pipe end faces 13 and the assisted induction weldable pipe connector 170 form annular contact zones 191A and 191B externally bound by the internal thermoplastic solder lining 103 and internally bound by the solder flow barrier 172. The annular contact zones 191A and 191B contain minute cavities due to surface contact tolerances between the exposed annular pipe end faces 13 and the abutment surfaces 114A and 114B.

FIG. 26B shows a welded sealed joint 192 subsequent to application of induction energy to the pre-welded joint 190 in a similar manner as explained in aforesaid WO 2012/137197. The internal thermoplastic soldering lining 103 melts and flows inwards towards the solder flow barrier 172 as it expands to fill the annular contact zones 191. The pipe tang pair 176 prevents any plastic deformation of the pipe ends 11.

FIG. 26C shows the welded sealed joint 192 after the solder flow barrier 172 has been dissolved by on fluid F flowing through the multi-layer pipes 10.

Figure 27A:
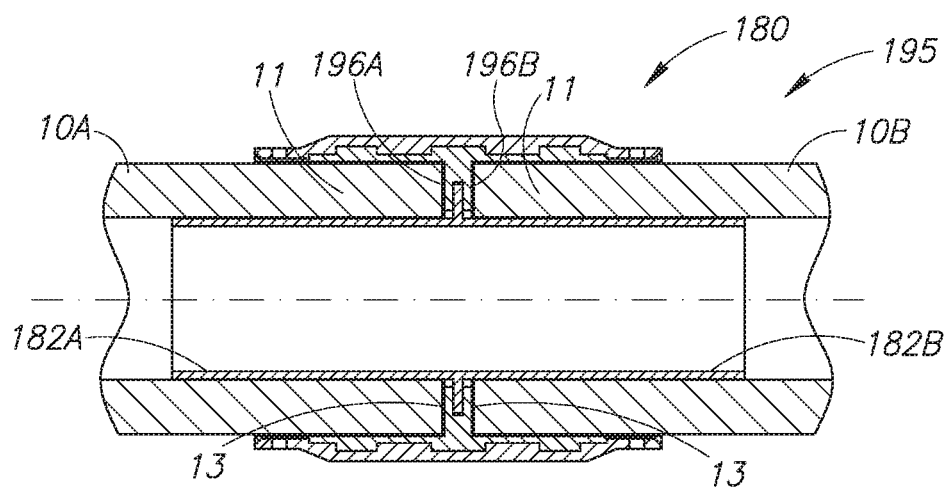
FIGS. 27A and 27B show the use of the FIG. 25 induction weldable pipe connector for end to end welding of two same diameter thermoplastic pipes.
Figure 27B:
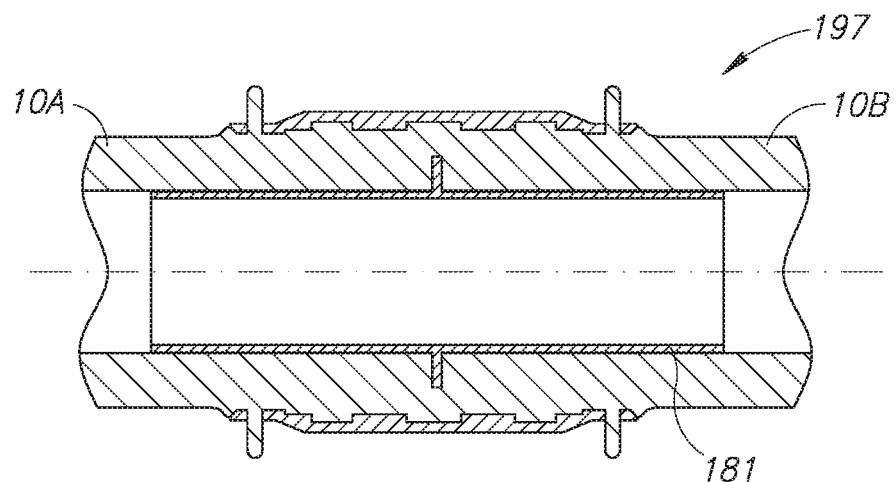

FIG. 27A and FIG. 27B show the use of the assisted induction weldable pipe connector 180 for end to end induction welding of two same diameter thermoplastic pipes 10.

FIG. 27A shows a pre-welded joint 195 of the assisted induction weldable pipe connector 180 and the thermoplastic pipes 10 on forced sliding insertion of the thermoplastic pipes 10 into opposite induction weldable pipe sockets 102 until abutment of their respective exposed annular end faces 13 against the central inwardly directed stop 114. The pipe tang pair 182 is slidingly inserted into the pipe ends 11. The exposed annular pipe end faces 13 and the assisted induction weldable pipe connector 180 form annular contact zones 196A and 196B externally bound by the internal thermoplastic solder lining 103 and internally bound by the solder flow barrier 181. The annular contact zones 196A and 196B contain minute cavities due to surface contact tolerances between the exposed annular pipe end faces 13 and the abutment surfaces 114A and 114B.

FIG. 27B shows a welded sealed joint 197 subsequent to application of induction energy to the pre-welded joint 195 in a similar manner as explained in aforesaid WO 2012/137197. The internal thermoplastic soldering lining 103 melts and flows inwards towards the solder flow barrier 181 as it expands to fill the annular contact zones 196. The pipe tang pair 182 prevents any plastic deformation of the pipe ends 11.

Section 8: ElectroMagnetic Induction (EMI) Coil Reverse Action Pliers

Figure 28:
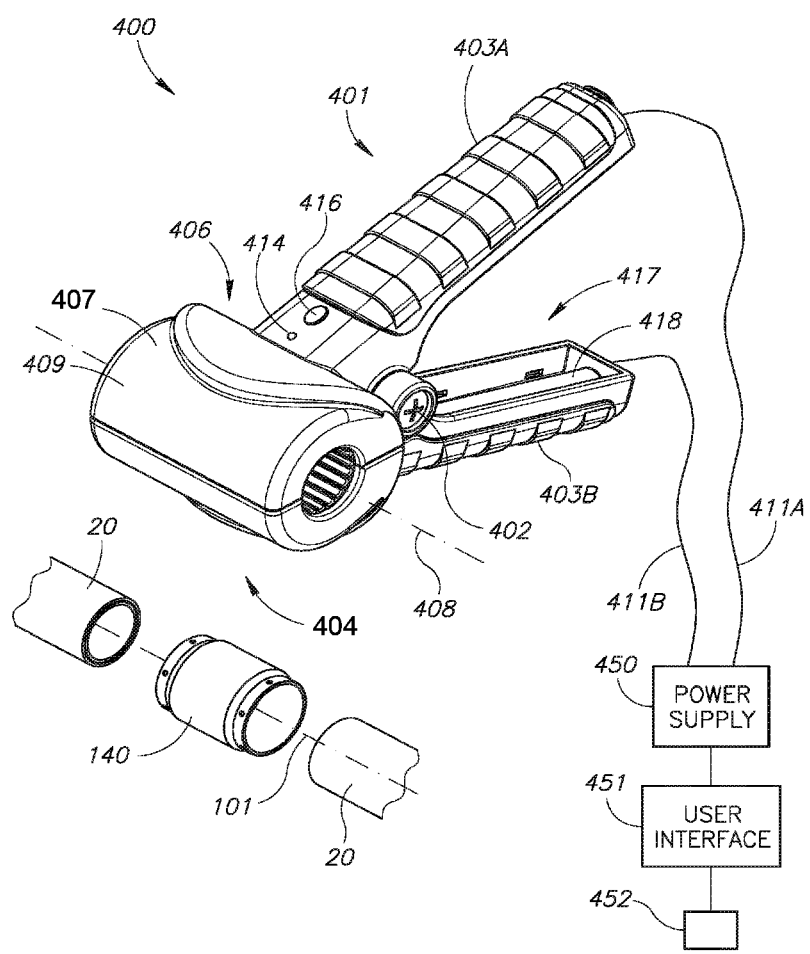
FIG. 28 is a perspective view of electromagnetic induction coil reverse action pliers for use with a power supply, an induction weldable pipe connector, and a pair of multi-layer pipes.
Figure 29:
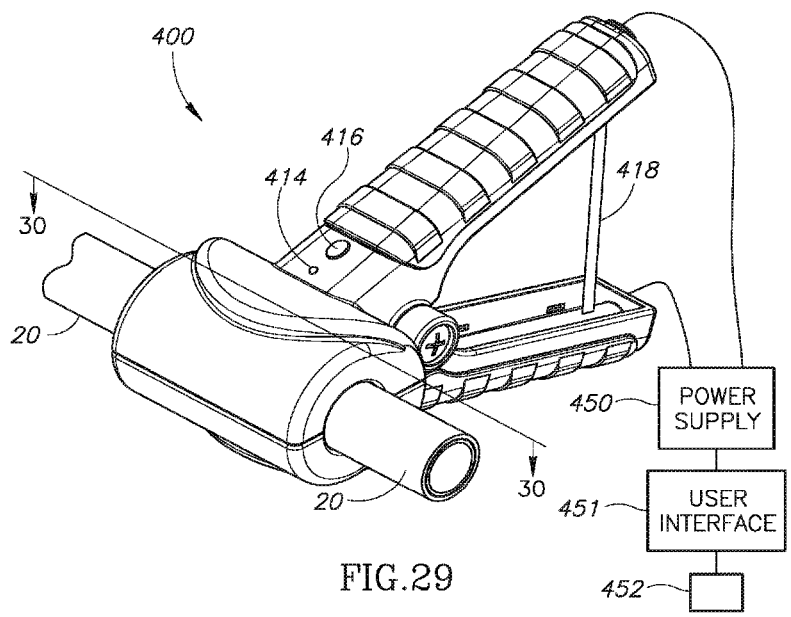
FIG. 29 is a perspective view of the pliers with a built-in lock mechanism in an operative state for preventing opening the jaw pair during an induction welding operation.
Figure 30:
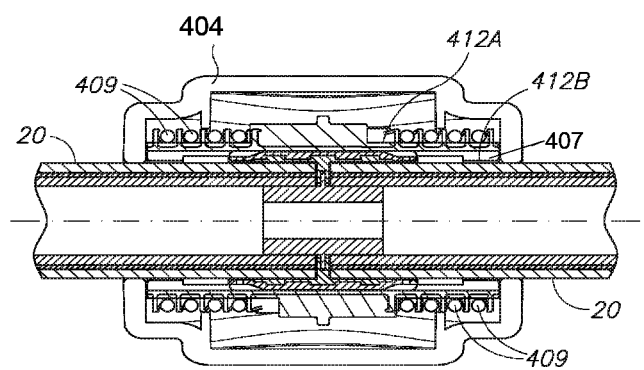
FIG. 30 is a longitudinal cross section of the pliers during an induction welding operation for end-to-end connecting the multi-layer pipe pair along line 30-30 in FIG. 29.

FIGS. 28 to 30 show ElectroMagnetic Induction (EMI) coil reverse action pliers 400 for use with a power supply 450 for induction welding of induction weldable pipe connectors to assemble fluid distribution systems. The pliers 400 can be designed for use with WO2012/13797 induction weldable pipe connectors and induction weldable pipe connectors 140.

The power supply 450 includes a user interface 451 for controlling induction welding operations. The user interface 451 includes a START switch 452 for activating an induction welding operation. The user interface 451 includes other controls for inputting pipe material and pipe diameter. Pipe material controls include inter alia touch selection buttons for PP-R, PEX, HDPE, ML and the like. Pipe diameter controls include inter alia touch selection buttons for 16-24 mm diameter, 25-32 mm diameter, 33-50 mm diameter, and 110 mm diameter. The power supply 450 determines the durations of induction welding operations and the voltage of induction welding operations based on the user input.

The pliers 400 include an elongated lever pair 401 pivoted at a fulcrum 402 for forming a long handle pair 403 for being comfortably hand gripped by a user to hold and use the pliers 400 and a short jaw pair 404. The pliers 400 include a biasing member 406 for normally biasing the jaw pair 404 into a closed position for defining a tubular coil housing 407 having a longitudinal coil housing axis 408 transverse to the lever pair 401. The jaw pair 404 can be opened on manually squeezing the handle pair 403 together to overcome the biasing member 406. The coil housing 407 is shaped and dimensioned to envelope an induction weldable pipe connector 140 therein on co-alignment of the longitudinal coil housing axis 408 and the longitudinal pipe connector axis 101.

The jaw pair 404 includes an electromagnetic induction coil assembly 409 for applying induction energy to the induction weldable pipe connector 140. The pliers 400 include an electrical wire pair 411 for connection to the power supply 450. The electrical wire pair 411 is separated such that one electrical wire 411A extends along one handle 403A and the other electrical wire 411B extends along the other handle 403B to reduce energy loss between the electrical wire pair 411.

The coil housing 407 has stepped internal surfaces 412 which are shaped and dimensioned to snugly receive an induction weldable pipe connector 140. The stepped internal surfaces 412 are formed with a central section 412A and an opposite end section pair 412B for correspondingly contacting the major central pipe connector section 141 and the minor lateral pipe connector sections 142. The opposite end section pair 412B is preferably each formed with a ribbed surface 413. The coil housing 407 ensures induction weldable pipe connectors 140 are optimally placed therein for optimal transfer of induction energy from the pliers 400.

The pliers 400 can include an ongoing induction welding operation indicator 414 for providing a user indication that an induction welding operation is in process. The user indication can be in the form of a visual alert, a vibrating alert, and the like. The pliers 400 can include a user operated switch 416 for operating the power supply 450 for starting and stopping an induction welding operation instead of from the power supply's START switch 452. The pliers 400 can additionally include a built-in lock mechanism 417 for preventing squeezing the handle pair 403 together during an induction welding operation. The lock mechanism 417 includes a pivotal rigid lock member 418 which is activated into an operative state during an induction welding operation (see FIG. 29).

While the invention has been described with respect to a limited number of embodiments, it will be appreciated that many variations, modifications, and other applications of the invention can be made within the scope of the appended claims.

The invention claimed is:

1. In combination an electromagnetic induction coil reverse action pliers and an induction weldable pipe connector, the pliers for use with a power supply having a first polarity terminal and a second opposite polarity terminal for induction welding the induction weldable pipe connector and a pair of plastic pipes to form a welded sealed joint, the induction weldable pipe connector having a central section and an outwardly facing pair of annular end surfaces, each plastic pipe having a plastic pipe end, the pliers having a biased closed position and an open position, the pipe connector having a length and a diameter, the pliers comprising:

(a) an elongated lever pair pivoted at a fulcrum there along for dividing said elongated lever pair into a long handle pair for hand gripping by a user and a short jaw pair;

(b) a biasing member for normally biasing said jaw pair into the biased closed position in which said long handle pair diverge from said fulcrum and said short jaw pair define a tubular coil housing having a longitudinal coil housing axis transverse to said lever pair for enveloping the induction weldable pipe connector such that said biasing is countered by manually squeezing said handle pair together for urging said jaw pair to the open position; and (c) an induction coil extending peripherally around said coil housing whereupon operation of the power supply energizes said induction coil to generate a substantially uniform electromagnetic field intensity at a given radial distance from the longitudinal coil housing axis for inducing electromagnetic induction in the induction weldable pipe connector and plastic pipe ends placed therein to form the welded sealed joint for joining the pair of plastic pipe ends;

wherein said coil housing has a stepped internal surface including a central section and a pair of lateral ends, wherein said central section of the coil housing has about the same length and diameter as the central section of the induction weldable pipe connector, and said pair of lateral ends have a smaller internal diameter than said coil housing central section; and wherein said pair of lateral ends are located beyond said induction weldable pipe connector central section on clamping said short jaw pair thereon such that inwardly facing annular end surfaces of the pair of lateral ends of the coil housing abut the pair of outwardly facing annular end surfaces of the pipe connector whereby said induction weldable pipe connector resides in said central section of the coil housing.

2. The pliers according to claim 1 wherein said induction coil includes an electrical wire pair for connection to the power supply wherein said electrical wire pair includes a first electrical wire extending along a first handle of said handle pair and a second electrical wire extending along a second handle of said handle pair.

3. The pliers according to claim 1, and further comprising an ongoing induction welding operation indicator for providing a user indication that an induction welding operation is in process.

4. The pliers according to claim 1, and further comprising a user operated switch for operating the power supply for starting and stopping an induction welding operation.

5. The pliers according to claim 1, and further comprising a built-in lock mechanism for precluding said squeezing of said handle pair together to open said jaw pair during an induction welding operation.

* * * * *